United States Patent
Shimizu

(10) Patent No.: US 7,864,635 B2
(45) Date of Patent: Jan. 4, 2011

(54) RECORDING HEAD

(75) Inventor: Junichiro Shimizu, Hino (JP)

(73) Assignee: Hitachi, Ltd., Tokyo (JP)

( * ) Notice: Subject to any disclaimer, the term of this patent is extended or adjusted under 35 U.S.C. 154(b) by 646 days.

(21) Appl. No.: 11/778,189

(22) Filed: Jul. 16, 2007

(65) Prior Publication Data
US 2008/0056073 A1 Mar. 6, 2008

(30) Foreign Application Priority Data
Aug. 30, 2006 (JP) ............................ 2006-233043

(51) Int. Cl.
*G11B 11/00* (2006.01)
(52) U.S. Cl. .................................... 369/13.02
(58) Field of Classification Search ............... 369/13.02
See application file for complete search history.

(56) References Cited

U.S. PATENT DOCUMENTS

| 7,064,355 | B2 * | 6/2006 | Camras et al. ............... 257/98 |
| 2005/0018547 | A1 * | 1/2005 | Akiyama et al. ......... 369/13.02 |
| 2006/0083116 | A1 * | 4/2006 | Rottmayer et al. ....... 369/13.02 |

FOREIGN PATENT DOCUMENTS

| JP | 2002-298302 | 10/2002 |
| JP | 2004-151046 | 5/2004 |
| JP | 2004-235182 | 8/2004 |
| JP | 2004235182 A * | 8/2004 |
| JP | 2004-273906 | 9/2004 |

OTHER PUBLICATIONS

Japan Journal of Applied Physics, vol. 25, (2000), pp. 1279 and Optics Letters.
Japan Journal of Applied Physics, vol. 42 (2003), pp. 5102 and Optics Letters.

* cited by examiner

*Primary Examiner*—Joseph H Feild
*Assistant Examiner*—Nicholas Lee
(74) *Attorney, Agent, or Firm*—Antonelli, Terry, Stout & Kraus, LLP.

(57) ABSTRACT

It is an objective that the optical loss and the number of optical components are reduced in an optical recording head using a near-field where a laser beam is guided from a light source to the tip of the head and a thermally assisted magnetic recording head. A structure where the traveling direction of emitted beam is rotated in the direction of the cavity of the laser diode element and a reflector for guiding the beam to the surface of the surface of the laser diode element is monolithically integrated in the laser diode element is mounted over the slider so that the direction of the cavity of the laser diode element is parallel to the surface of the recording medium, and the substrate side of the laser diode element is mounted to be in the direction opposite the face adjacent to the upper face of the slider.

8 Claims, 13 Drawing Sheets

RECORDING HEAD

CLAIM OF PRIORITY

The present application claims priority from Japanese application JP 2006-233043 filed on Aug. 30, 2006, the content of which is hereby incorporated by reference into this application.

FIELD OF THE INVENTION

The present invention relates to a recording head, and, specifically, relates to an information recording device with high recording density, an optical recording device which includes an optical recording medium and a means for writing on the recording medium by using a laser beam, and an optical/magnetic hybrid recording device which includes a magnetic recording medium, a means for writing on the recording medium by a magnetic field, and a means for heating the recording medium by using a laser beam. Specifically, it relates to a head for an optical disk which includes a structure for guiding a laser beam to the recording medium and performs recording by using a near-field light and a hybrid magnetic recording head which includes a structure and a read/write magnetic pole for guiding a laser beam to the recording medium and performs recording by using a near-field light.

BACKGROUND OF THE INVENTION

Digitization of voice and images and an increase in the quality thereof have advanced with the development of an information-oriented society these days, and the amount of data communication over the internet has been increasing remarkably. With this increase, the amount of electronic data stored in servers, etc. increases, so that there has been a need for the capacity of the information recording system to be increased. Increasing the recording density is required of an optical disk and a magnetic disk mounted in a computer, etc. in order to store huge information without enlarging the device as one of the information recording devices. Increasing the recording density means making the recording bit size minute.

In an optical disk, a method is used where the beam spot of a laser beam is focused to a bit size using a lens. Making the laser beam a shorter wavelength is effective for making the spot size minute. The minimum spot diameter of beam focused by a lens is expressed in terms of the ratio of the wavelength and the numerical aperture of the lens used for focusing, and the shorter the wavelength, the more effective is the increase in the recording density. However, there is a limit to the increase in the density using a technique where the spot is made smaller by making the wavelength of the laser beam shorter. Therefore, a smaller beam spot is necessary for a bit size which is required of a recoding density of the Tb/in$^2$ class. In order to solve this problem, it has been discussed that the spot size is made smaller not by focusing beam using a lens, but by narrowing the distance between the recording medium and the head and using optical near-field.

In order to achieve a high recording density in a magnetic disk device, it is necessary that the distance between the recording medium and the head be made smaller and the crystal grain size of the magnetic film of the magnetic recording medium be minute. Making the crystal grain size in the magnetic recording medium minute is attended by the problem that the grains become thermally unstable. In order to secure the thermal stability while the crystal grain size is made minute, it is effective to make the coercivity greater. An increase in the head magnetic field strength necessary for recording is needed because of an increase in the coercivity. However, since there is a limitation in the characteristics of a magnetic pole material used for a recording head and a limitation in making the distance between the magnetic disk and the head smaller, it is difficult to increase the coercivity with an increase in the recording density. In order to solve the aforementioned problem, a hybrid recording technology has been proposed in which an optical recording technology and a magnetic recording technology are combined. The coercivity of the medium is decreased by heating the medium concurrently with generating an applied magnetic field when recording. As a result, recording becomes easier on a recording medium with high coercivity where recording has been difficult with a conventional magnetic head because of insufficient recording magnetic field strength. A magnetoresistance effect used for a conventional magnetic recording is used for reading. This hybrid recording method is called thermally assisted magnetic recording or optically assisted magnetic recording. Herein, as a heating mechanism by using a beam, a means where a laser beam is focused by using a lens can be used, which is used in conventional optical recording. However, the increase in the recording density of the magnetic disk device also has a limitation in the spot diameter which can be focused by a conventional technique, the same as the optical disk. As a means for solving this, a means utilizing optical near-field has been proposed, the same as the optical disk.

In an optical recording and thermally assisted magnetic recording which uses optical near-field, a laser beam generated by a laser source is guided to the recording head and the spot radius is converted to a suitable size and shape for recording by using an element which has a function of generating optical near-field (hereinafter, it is called an optical transducer) Generally, a semiconductor laser diode (hereinafter, it is called LD) which is small and low power consumption in the laser source is used for a laser source because of the necessity to use it in a disk drive package.

Both optical recording and thermally assisted magnetic recording need sufficient beam intensity for recording. In an optical recording, it is a beam intensity which is necessary for changing the characteristics of the material constituting the bits, and, in a thermally assisted magnetic recording, it is a beam intensity which is necessary for heating it up in order to sufficiently decrease the coercivity for easily performing the magnetization reversal of the recording medium.

The optical output generated by a semiconductor laser is generally about 30 to 100 mW in the 780 nm wavelength range and the 650 nm wavelength range which are the wavelength ranges spread widely as a present light source for optical recording. Optical loss is produced until the optical output reaches the surface of the recording medium and it becomes about several mw. The same level of optical output is required at the surface of the recording medium even in the applications of a thermally assisted magnetic recording device and an optical recording device which uses optical near-field to achieve a recording density in excess of a Tb/in$^2$.

The optical transducer is an element which generates beam with a very small spot size from beam with a relatively larger spot size by using a plasmon resonance. The size of one bit is 25 nm or less in a recording density of Tb/in$^2$ class and the size of the optical transducer is about several hundreds of nanometers to 1 micrometer. An optical transducer is described in, for instance, JP-A No. 2004-151046.

An optical component is used for guiding the beam generated by an LD element to the optical transducer. Since optical loss is produced until the beam generated by the LD element is guided to the optical transducer and the spot size of the beam focused by a waveguide and a lens is larger than the size of the optical transducer, the beam which enters the optical transducer and is converted to the optical near-field is only about several to ten-odd percent of the injected light. Therefore, concerning the optical loss produced until reaching the recording medium, a sufficient optical output is required for the LD element. However, the beam intensity that a semiconductor LD element can generate is not limitlessness, so that it should be driven by an optical output generated by a certain driven current and a power consumption which are rated for an LD element.

An optical component which guides a laser beam generated by an LD element to the optical transducer is a reflector, a lens, and an optical waveguide. The beam generated by the LD element propagates in the optical component arranged in the optical path and reaches the optical transducer and the recording medium ahead thereof. The beam intensity attenuates during transmission through the optical path and it becomes a fraction of several to several tenths the optical output generated by the LD element. The main reason of the attenuation of the beam intensity is adsorption loss and scattering loss during propagation through the optical components and coupling loss caused by the misalignment (displacement of the optical axis and difference in the spot size) created by connections among the optical components. These optical losses are collectively called propagation losses.

In order to obtain sufficient beam intensity necessary for recording, it is necessary to increase the beam intensity generated by the LD element or to decrease the propagation loss. Driving the LD element by a large current is necessary to increase the optical output of the LD element and an increase in the output of the LD element is necessary. However, since there is a limit to the optical intensity generated by the LD element, it is not realistic to enlarge only the optical intensity of LD element. Because making the output of the LD element greater is generally attended by enlargement of the element. The enlargement thereof requires operation using large currents and this causes a remarkable increase in the power consumption and generation of heat in the LD element. Therefore, the key technology is to effectively guide the beam generated by the semiconductor laser to the tip of the head, that is, by decreasing the propagation loss.

In order to efficiently guide the light generated by the LD element to the tip of the head, it is a requirement that the optical loss produced inside the optical components and the coupling loss produced at the junctions of the optical components be made smaller. The optical loss produced in the optical components arises from the adsorption and scattering of the beam caused by the characteristics of the material constituting the components. The coupling loss produced at the junction of the optical components is mainly caused by the misalignment of the shape of the optical field that each optical component has, the distance in the direction of the optical axis which is created while the optical components are connected, and displacement of the components in the direction perpendicular to the optical axis. It is necessary for decreasing the former optical loss to decrease the optical distance by using a material with low scattering and low adsorption and making the components smaller. And it is necessary for decreasing the later coupling loss to match the size and shape of the optical field that the components have and to prevent the optical axis from being displaced in the axial direction and the horizontal direction of the components. When the optical loss is decreased, the optical output required for the LD element can be reduced, resulting in the optical output necessary for recording being obtained. Moreover, the LD element can be made smaller and a lowering of the power consumption can be achieved. As a result, the limitation caused by the size of the LD element becomes smaller and the freedom of design thereof, such as the arrangement of the LD element, etc., increases.

The spot size of the laser beam emitted from the LD element is generally about 1 µm to 2 µm at the emission face and, it is too large to be applied the recording bit as is since it enlarges with distance from the emission face. In order to convert the spot size and the shape, an optical transducer is necessary. It is difficult to completely eliminate the occurrence of the propagation loss so long as optical components are used, from the LD element to the optical transducer, and there is an actual limitation on decreasing optical loss only by material selection and alignment technique. Moreover, the optical recording head and the magnetic recording head itself are smaller than these optical components and, when the optical components are arranged, there is a limitation on mounting caused by the size of the components themselves and the tolerance required for the optical system, so that a structure where the propagation loss is reduced is difficult to achieve.

Therefore, decreasing the number of optical components is the best solution for solving the limitation on mounting as well as for achieving the decrease in the propagation loss produced between the light source and the recording medium. Therefore, it is preferable that the LD element which is a light source be arranged in the vicinity of the head and be connected to the head part without using any optical component between the LD element and the head. That is, integrating the LD elements over the head is one of techniques for minimizing the propagation loss.

However, especially in a magnetic disk typified by a hard disk drive, the size of the tip part which is a main component of the recording head is a hexahedron having one edge of several hundred micrometers and the size is on the same order as the LD element. Therefore, a limitation exists on mounting caused by the size of the LD element in the case of the arrangement where the LD element which is a light source is mounted over the head.

In the optical disk head and the thermally assisted magnetic recording head which use the optical near-field, a means is adopted in which the LD element is installed outside of the head and the beam is guided to the optical transducer provided at the tip of the head by using the optical components in the example where a structure is realized in the experiment. As shown, for instance, in Japan Journal of Applied Physics, Vol. 42 (2003), pp. 5102 and Optics Letters, Vol. 25 (2000), pp. 1279), a means is adopted in which the LD element is arranged at a position except for the head and the beam is guided to the recording head by using an optical waveguide such as an optical fiber, etc. However, in a case where a practical recording head is concerned, it is considered that the propagation loss becomes greater when the LD element which is a light source is separated from the head and the beam passes through a plurality of optical components.

SUMMARY OF THE INVENTION

The means in which the LD element is placed at a position away from the head has an advantage that the limitation on the size and the mounting shape of the LD element can be relaxed, but there is a disadvantage that the number of optical components and the beam loss become greater. Moreover, a disadvantage also exists in which mounting of the optical system of the optical components becomes complicated. In order to solve this problem, a means is required to achieve a recording head where the number of optical components is decreased and the mounting technique is simple. When the number of the optical components is decreased, the positions which require alignment are decreased. Therefore, it makes it possible to decrease the coupling loss and the beam generated by the LD element can be efficiently guided.

Arranging the light source in the vicinity of the head makes the optical path length smaller and decreases the adsorption loss and the scattering loss. Moreover, simple mounting which uses a small number of optical components decreases the coupling loss. The means where the LD element is placed as close as possible to the head is mounting the LD element directly to the head. However, in the case of an optical head and a magnetic head which use optical near-field, the order of the size of the LD element is the same as the head and it is a size which cannot be ignored. Therefore, mounting an LD element carelessly on the head which flies over the disk rotating at high speed may influence the movement of the head. Mounting any optical component except for an LD element gives the same effect. At present, the size of a component at the tip of the head, a so-called slider, which is a main component used for magnetic recording has a length and a width of 1000 μm or less and a thickness of about 300 μm at the thickest. Moreover, in the future, it is expected that the head will be made smaller and the length, width, and thickness thereof will be made further smaller.

As mentioned above, the size of the slider and that of the LD element mounted are not much different and the mounting shape of the LD element influences the shape of the entire head in the means where the LD element is directly mounted on the slider. The emission direction of the beam of the edge emitting type LD element which is most widespread is the direction of the cavity of the LD element. Therefore, in order to guide the beam of the LD element to the optical transducer placed at the lower part of the slider, the cavity of the LD element is generally mounted in the direction perpendicular to the plane where the recording medium exists.

The size of a typical semiconductor edge emitting type laser diode element for recording has a length of about 500 to 1500 μm, a width of about 200 to 400 μm, and a thickness of about 100 μm. The length of the LD element means the length of the cavity and it has a close relationship with the optical output that the LD element can generate.

The length of the cavity of the LD element is several times greater than the thickness of the slider. On the other hand, the slider flies against the medium keeping a small gap against the rotating recording medium. This is a structure where the position of the slider and the medium are kept parallel. Even with a disk rotation speed in excess of 10,000 rpm, the shape of the slider flying aerodynamically stably is made accurate. When the LD element is mounted over the slider to be the direction where the cavity is perpendicular to the recording medium, the shape of the entire head on which the LD is mounted becomes a structure where the longitudinal direction is the longest. This mounting technique brings about not only instability of flying of the head against the medium but also a limitation in the space where the head can be moved.

When an LD element having a short cavity is used where the length of the cavity is about 100 μm, there is a possibility to solve the aforementioned problem. However, there is a trade-off relationship that the maximum value of optical output which can be generated becomes smaller when the length of the cavity is made smaller. Therefore, when the edge emitting type LD element is made using a short cavity, sufficient optical output cannot be obtained like an LD element generally used for recording. Moreover, in a surface emitting type LD element such as a VCSEL (Vertical Cavity Surface Emitting Laser), the length of the cavity can be made considerably smaller than that of an edge emitting type LD, but, the same as a surface emitting type LD element with a short cavity, an optical output of only several mW can be obtained at the point when the optical output is emitted from the LD, so that it is quite insufficient for the optical output necessary for recording. Therefore, it can be said that the approach of making the cavity short is not suitable for this purpose.

As mentioned above, the slider has the shape of a hexahedron and the direction parallel to the medium is longer than the direction perpendicular to the medium. Therefore, mounting the cavity over the slider in the direction parallel to the medium is relatively easier than mounting it in a perpendicular direction, and the effects on the flying properties and the mobility of the head are small. However, since the LD element emits beam in the direction of the cavity, an optical structure is necessary for rotating the traveling direction of the beam emitted in the parallel direction by about 90 degrees and guiding it to the optical transducer at the tip of the slider.

It is generally as shown in JP-A No. 2002-298302 that an optical mirror is used for rotating the direction of the beam by about 90 degrees over a short distance. As an optical mirror, there is a mirror where the light propagates inside the components and is reflected at the boundary with the space and a mirror where the light propagates in space and is reflected at the boundary with the component. In the case of the former mirror, a glass system material such as a prism is generally used.

An optical transducer is installed over the air bearing surface of the slider and it is necessary to inject the beam rotated in the traveling direction by the reflector. As a means to guide the beam from the upper part of the slider to the optical transducer at the lower part of the slider, there is a means which focuses the beam to the optical transducer by using a lens and a means which uses an optical waveguide. Among them, one in which the laser beam can effectively be focused on the optical transducer is a means using an optical waveguide. The optical waveguide generally includes a core with a high refractive index located at the center thereof and a cladding with a low refractive index and it is a structure in which the light is confined within the core. The beam spot is made minute by using a material with a high refractive index for the core and a near-field can be created by efficiently coupling with the optical transducer.

Here, efficient optical coupling between the LD element and the optical waveguide is important in order to guide the beam from the LD element to the optical waveguide formed in the slider. The better the similarity in the shape and the size of both optical fields of the coupling side and the side being coupled, the better is the coupling of the two waveguides optically with high efficiency. Moreover, the shorter the distance between the waveguides of the coupling side and the side being coupled, the better is the coupling with high efficiency.

A case is considered where the beam is coupled from the LD element to the waveguide formed in the slider by using a reflector. The beam emitted from the LD element travels by way of the optical path according to the size of the mirror when it passes the reflector. Because of the production of the reflector, the size of the reflector becomes several tens of microns at the smallest in the longitudinal and latitudinal lengths which is the direction of the waveguide of the beam, resulting in the optical path length being several tens of microns at the smallest. However, when the beam emitted from the LD element propagates in the material of the reflector and in air, the optical field expands drastically and the tendency is more pronounced the greater length of the optical path and the smaller the refractive index. FIG. 1 shows calculation results of the relationship between the optical path length and spot radius. Letting the spot radius at the emission face be 1 μm which is typical for a semiconductor LD element for recording, the beam spot is calculated as a one-dimensional Gaussian distribution. The differences of the broadening of the spot radius according to the refractive index of the optical path are shown in the same figure. Since the material is a glass system and the optical path is free propagation passing through the material with a refractive index of about 1.5 in the case of a reflector such as prism, etc., the optical field expands considerably expanded while passing the reflector. As a result, the coupling efficiency to the optical waveguide in the slider decreases drastically compared with the case when it does not pass through the reflector.

As a means to prevent the decrease in the coupling efficiency, there is a means which uses a collimating lens. As described in JP-A No. 2004-151046, collimating lenses are arranged before and after passing the reflector, thereby, the beam emitted from the LD is converted to a collimated beam and let to pass the optical path of the reflector. As a result, passing the reflector prevents the optical field from expanding even when the optical distance is created, and the beam is focused again by using a lens after passing the reflector and coupled to an optical waveguide with a small spot diameter in the slider.

Although the coupling efficiency and mounting tolerance are improved in the means using a lens, disadvantages are created such as an increase in the optical distance by using a lens, an increase in the mounting space and the number of components, and an increase in the points for alignment. Moreover, the actual size of the lens is generally several hundreds of microns to several thousands of microns, so that it is too large to mount over the magnetic head including the aforementioned slider. It becomes more serious when the head is further miniaturized, and the feasibility is low.

The inventors found out for solving the aforementioned problems that it is necessary to mount the laser source over the slider so that the cavity is in the direction parallel to the medium and to high-efficiently couple it to the waveguide in the slider without using a lens. It is an objective of the present invention to provide a structure for mounting a horizontal cavity type laser source over a slider in the direction where the cavity is parallel to the medium and for highly efficiently coupling it to the optical waveguide in the slider without using a lens. Moreover, it is an objective to provide a recording head which includes a laser beam guiding structure suitable for optical near-field recording and thermally assisted magnetic recording.

The present invention provides a configuration in which the light emitted from an LD element is guided to an optical transducer, etc. at the lower part of the slider with smaller losses than before in a recording head which needs a laser beam.

When an LD element which becomes a light source is mounted over the slider, it was mentioned before that an edge emitting type laser which can obtain the necessary optical output is mounted in the direction where a cavity is parallel to a recording medium, and that it is necessary that there be a reflector for rotating the traveling direction of the beam emitted by the LD element to about 90 degrees to couple to the slider and a collimating lens for preventing the optical spot from expanding in the optical path in order to guide the beam emitted by the LD element to the tip of the slider. However, considering the size of the components, it has also been mentioned before that in practice, mounting an LD element, a reflector, and a lens over the slider is difficult.

In the present invention, a method described as follows is provided to solve the above-mentioned problems. A structure is considered in which a micro-mirror composed of a material with a high refractive index is monolithically integrated at an emission edge of an edge emitting type LD element. Since the micro-mirror is monolithically integrated with the LD element, it is easily manufactured when it is composed of the same material as the LD element. The reflector directly connected to the cavity is made by directionally etching the active layer in the fabrication process of the LD element. When it is composed of only a transparent material among the materials used for the integrated LD elements, that is, a material which has a smaller band gap than the energy of the emission wavelength of the LD element, the adsorption loss while the beam passes the micro-mirror can be made small. As shown in, for example, JP-A No. 2004-273906 and JP-A No. 2004-235182, the micro-mirror monolithically integrated with the LD element has many variations in the manner of the direction and the arrangement.

Using the aforementioned structure, the beam emitted in the direction of the cavity is rotated about 90 degrees by using the micro-mirror angled at about 45 degrees with the cavity and the beam can be emitted from the surface of the LD element. The cavity of the mirror-integrated LD element is mounted over the slider in the direction parallel to the recording medium and the light emitted from the surface of the LD element is directly coupled to the optical waveguide structure provided in the slider.

FIGS. 2, 3, and 4 are structural schematic drawings of an LD element used for a method proposed in the present invention, in which a reflector is monolithically integrated. FIG. 2 is a cross-sectional drawing of the LD element in the vicinity of the active layer in the direction of the cavity. FIG. 3 is a perspective drawing where the surface of the LD element can be seen. FIG. 4 is a perspective drawing where the face of the substrate side of the LD element can be seen. It has a shape where a micro-mirror 105 which rotates the traveling direction of the beam about 90 degrees is integrated at the optical emitting edge of the edge emitting type LD element formed over the semiconductor substrate 101, and the beam reflected at the micro-mirror 105 is emitted from the surface.

An active layer 102 of the LD element sandwiched between the lower cladding layer 103 and the upper cladding layer 104 is formed over the substrate 101 by using epitaxial crystal growth such as MOCVD (Metal Organic Chemical Vapor Deposition) and MBE (Molecular Beam Epitaxy), etc. and it exists at a position several microns from the surface. As a substrate material, GaAs, InP, and sapphire, etc. can be used. Since the thickness of the substrate is generally about 100 μm, when the beam whose direction is changed by the micro-mirror 105 reaches the surface by propagating through the substrate side, the beam passes the optical path length expressed by the product of 100 μm which is the thickness of the substrate and the refractive index of the substrate, so that losses are produced depending on the material of the substrate during propagation. Moreover, although the refractive index of a compound semiconductor generally used for a substrate is about 3 to 4 and the refractive index of an oxide system is about 1.5 to 2.5, it is clear that the coupling efficiency with the waveguide in the slider decreases because the spot size of the beam expands more than the calculation results shown in FIG. 1.

Therefore, it is preferable that the emission face of the beam emitted from the LD element be the surface closer to the active layer 102, that is, the surface opposite the substrate

101. When such a structure is taken, the optical path length, from the surface of the LD element to emission, by propagation of beam in the integrated micro-mirror is the same as the depth from the surface of the LD element to the active layer of the LD element.

When coupling between the beam generated by the active layer of the LD element and the optical waveguide in the slider, a structure is good when the optical path from the active layer to the waveguide in the slider is as short as possible, and the optical path length is several microns in the case of making the surface closest to the active layer 102 of the LD element an emission face. In the case of a general semiconductor LD element such as a GaAs system and an InP system, etc., this corresponds to the thickness T of the cladding layer 104 and it is about 2 µm. Moreover, the material to be the optical path is composed of the same material as the LD element, and it is a material with a refractive index of 3 or more, so that the expansion of the optical spot is small. Furthermore, when the material of the optical path is transparent to the emission wavelength, the optical loss caused by adsorption can be decreased.

It is understood that the optical field is an optical path length of an extent which hardly expands, even when viewed from the calculation results of the relationship between the optical path length and the spot radius which are shown in FIG. 1. When the optical emission face of this LD element approaches the upper surface of the slider and the emitting beam is coupled to the optical waveguide in the slider, the beam can be guided to the optical transducer by propagation in the optical waveguide in the slider.

The outline of this invention will be described referring to FIG. 6 and FIG. 7. The semiconductor LD element 100 is composed of a lower cladding layer 103, an active layer 102, and an upper cladding layer 104 provided over the semiconductor substrate 101; a part or all of one edge side is an inclined face (inclined face of the reflector 105), and this inclined face is provided to have wider skirts along the direction of the cavity from the substrate 101 side in the direction of the face opposite the substrate (the face of the upper cladding layer side). The appearance is as shown in FIG. 6 and FIG. 7. The output beam from the active layer 102 is reflected by the mirror 105 and guided to the face of the side opposite the face of the substrate 101 side (the face of the upper cladding layer side).

The optical waveguide 113 is provided in the direction of the thickness of the slider 111 and penetrating the slider 111 in the vicinity of one edge of the slider 111, and an optical transducer 115 is provided at the air bearing surface (ABS: Air Bearing Surface) of said slider. The face opposite the face of the substrate 101 side of the semiconductor laser element 100 (the face of the upper cladding layer side) is fixed to the face opposing the air bearing surface of the slider 111, and the optical axis of the beam emitted from this face is fixed almost to be in agreement with the optical axis of the optical waveguide 113.

The feature of the present invention is a recording head having these configurations. As a result, since the beam emitted from the semiconductor laser element can be directly guided to the optical waveguide 113 in the slider, the propagation loss of the beam produced by the semiconductor laser element can be made smaller than in the prior art, and an optical output sufficient for recording can be supplied to the air bearing surface of the slider.

Next, the connection between the semiconductor LD element 100 and the slider 111 will be described. In order to mount the LD element over the slider and couple the emitting beam to the optical waveguide in the slider, it is necessary to align the optical axes of the beam emitted from the LD element and the optical waveguide in the slider. Therefore, markers to register the positions with each other are provided in both the LD element and the slider. This marker may be a metallic pattern which is formed simultaneously while the electrode is being patterned and may be an index pattern which is formed simultaneously with the Mesa structure, etc. of the LD element. The marker on the slider side becomes a self-alignment type when it is manufactured simultaneously with the waveguide and misalignment of the mounting position and the marker is not created.

Hereinafter, the face formed by crystal growth of the LD element, that is, the face close to the active layer is called the surface of the LD element and the face of the substrate side is called the rear surface, and a situation is considered where an LD element is mounted over the slider. A marker is provided at the surface of the LD element. Moreover, in order to register the position for mounting the LD element over the slider, a marker is provided at a position corresponding to the marker of the LD element. Highly efficient optical coupling between the beam emitted from the LD and the waveguide placed in the slider can be achieved by accurately matching the marker at the surface of the LD element with the position of the marker at the upper surface of the slider using an alignment technique such as an infrared transmission method, etc. Although the accuracy of the alignment depends on the characteristics of the camera used and the movable stage, etc., highly accurate positioning within ±1 µm is possible. Moreover, consideration is given to misalignment in the traveling direction of the beam, that is, in the direction perpendicular to the mounting face. This misalignment is caused by the gap created between the optical emission face of the LD element and the upper face of the slider during mounting. The LD element is mounted by using an adhesive like solder. Since the thickness of the adhesive is about several microns and a minute gap is created between the optical emission face of the LD element and the optical injection face of the slider due to the thickness of the adhesive, there is concern that the optical coupling efficiency decreases at the gap between the optical emission face of the LD element and the optical injection face of the slider. It is possible for the optical emission face to approach the injection face and to obtain highly efficient optical coupling by compensating for the amount which corresponds to the thickness of the adhesive for the shape of the slider, for example, by lowering the face for loading the LD element over the slider by a height corresponding to the thickness of the adhesive used for mounting.

Moreover, it is necessary to provide an electric lead line for driving the LD element over the slider. The LD element is generally composed of a stacked structure of a p-type semiconductor and an n-type semiconductor, and the polarity of the substrate is opposite the polarity of the electrode at the surface layer. Therefore, many semiconductor LD elements have a pair of electrodes at the substrate side and the surface side close to the active layer. When the polarity of the substrate is n-type, the opposite side is an electrode with p-type polarity. However, in the case of mounting over the slider, both p- and n-type electrodes are necessary to be formed on the same side which contacts the slider in order to supply the power from the lead line over the slider. Although the example where p-electrodes and n-electrodes are formed on the same side is not main-stream for a semiconductor LD element, it can be generally seen in an InGaN system laser diode where sapphire is used for the substrate.

Moreover, it is possible to register the positions with high accuracy. This method is a means to achieve high coupling between a semiconductor LD element and an optical fiber in the field of emission components for optical communication and it is called active alignment. Active alignment is a method in which, while the LD element is emitting light, the thing to be optically coupled is moved to a position where the optical coupling efficiency becomes greatest and is fixed by using an adhesive. In this case, a fixed driving system is necessary to drive the LD element. In the present invention, the LD element is not directly mounted over the slider for driving the LD element, but a means is proposed where the LD element is mounted over the stage which is called a sub-mount and the sub-mount on which the LD element is mounted is mounted over the slider. The electric lead line for supplying power to drive the LD element is patterned over the submount and the LD element can emit beam over the submount. The slider is aligned in a state where the LD element is emitting light, and while monitoring the light which is propagating in the optical waveguide in the slider and being emitted from the lower part of the slider, the submount is fixed at the position where the position with the best coupling efficiency is detected. As a result, a highly accurate registration of position can be made compared with a passive alignment method which uses only the above-mentioned markers.

When the structure described above is used, the joint part which requires alignment of the optical axis is only the coupling of the beam from the optical emission face of the LD element with the optical waveguide provided adjacent to the slider. An optical coupling with a tolerance sufficient for mounting can be achieved by matching the LD element with the field shape of the waveguide in the slider. The optical spot shape at the emission face of the LD is made a Gaussian shape with a length of 2 μm and a width of 1 μm, which are typical values. FIG. 5 shows the calculation results of the coupling efficiency of the LD element and the waveguide at that time. Even when the optical emission face of the adjacent LD element is 10 μm away from the upper surface of the slider, the coupling loss is 2.3 dB in the case of a displacement of 1 μm in the longitudinal direction and a coupling loss is 4.6 dB in the case of a displacement of 1 μm in the vertical direction. Even when the optical axis is longitudinally and latitudinally displaced by 1 μm, respectively, the coupling loss becomes the small enough value of 6.9 dB which is the sum of these. This becomes about 20% when this is expressed in terms of the coupling loss. For instance, when the LD produces 50 mW of output, 10 mW is guided to the waveguide and sufficient optical output can be supplied to the optical transducer.

Up to this point a thermally assisted magnetic recording head has been mainly described. However, embodiments of the present invention can be applied to an optical recording head which writes by using only a laser beam and an optical near-field recording head can be achieved.

According to the present invention, the beam from a laser source can be guided to an optical transducer, etc. with a lower loss than that of the prior art.

DETAILED DESCRIPTION OF THE PREFERRED EMBODIMENTS

First Embodiment

Figure 1:
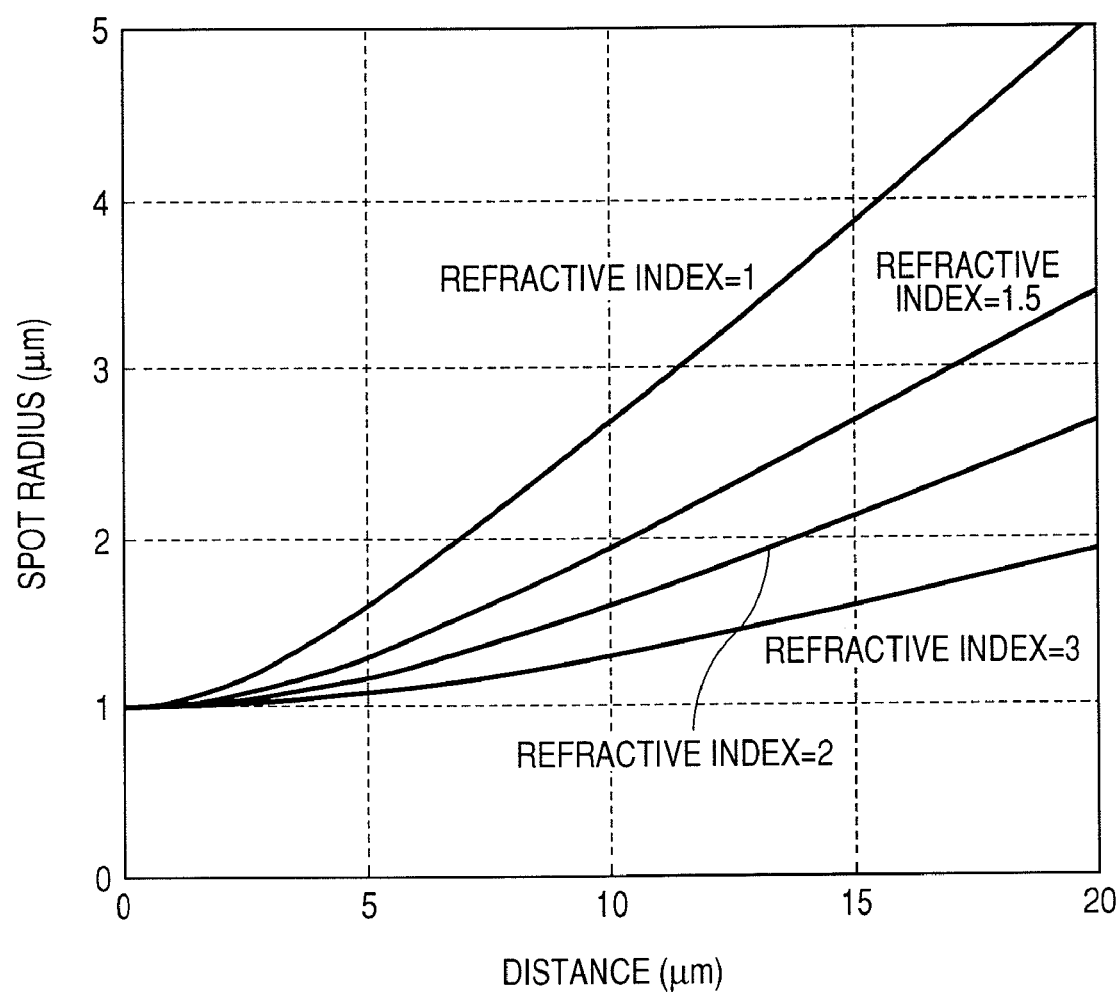
FIG. 1 is a graph which shows the calculated relationship between the optical path length and the spot radius.
Figure 2:
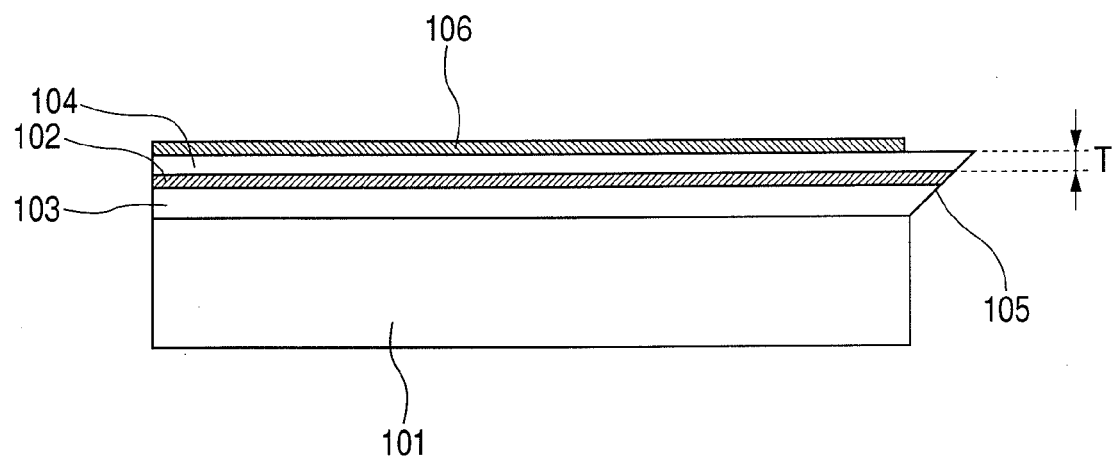
FIG. 2 is a cross-sectional schematic drawing illustrating a semiconductor laser diode where a reflector is monolithically integrated.
Figure 3:
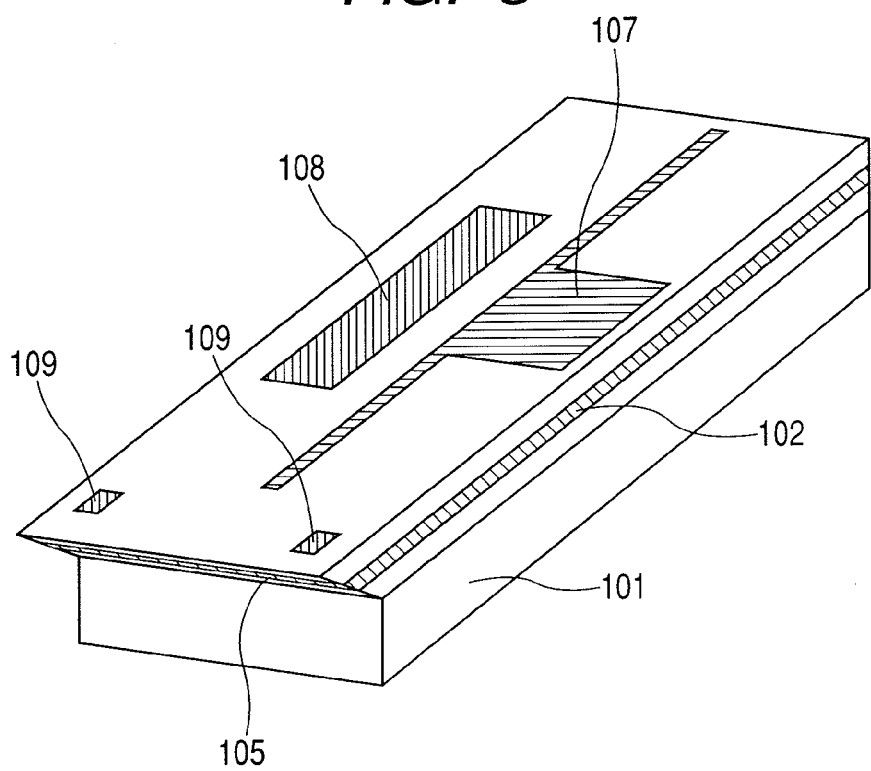
FIG. 3 is a perspective drawing illustrating a semiconductor laser diode where a reflector is monolithically integrated.
Figure 4:
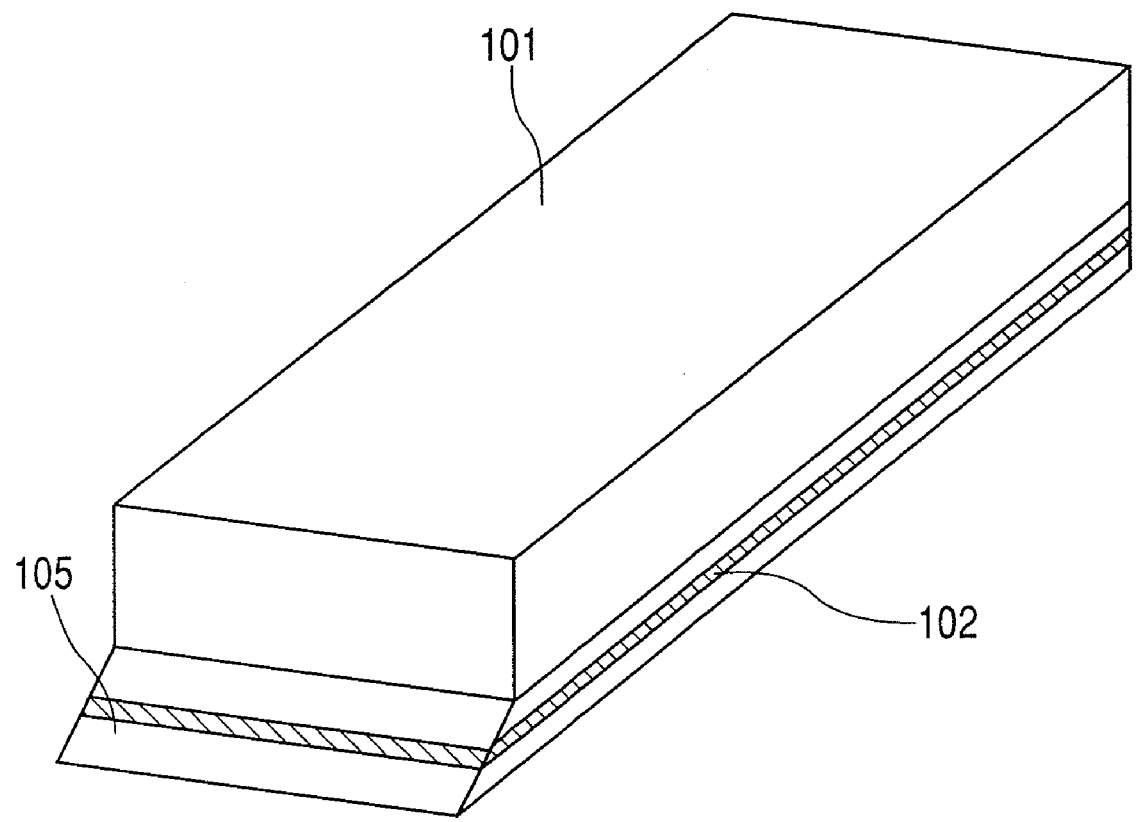
FIG. 4 is a perspective drawing illustrating a semiconductor laser diode where a reflector is monolithically integrated.
Figure 5:
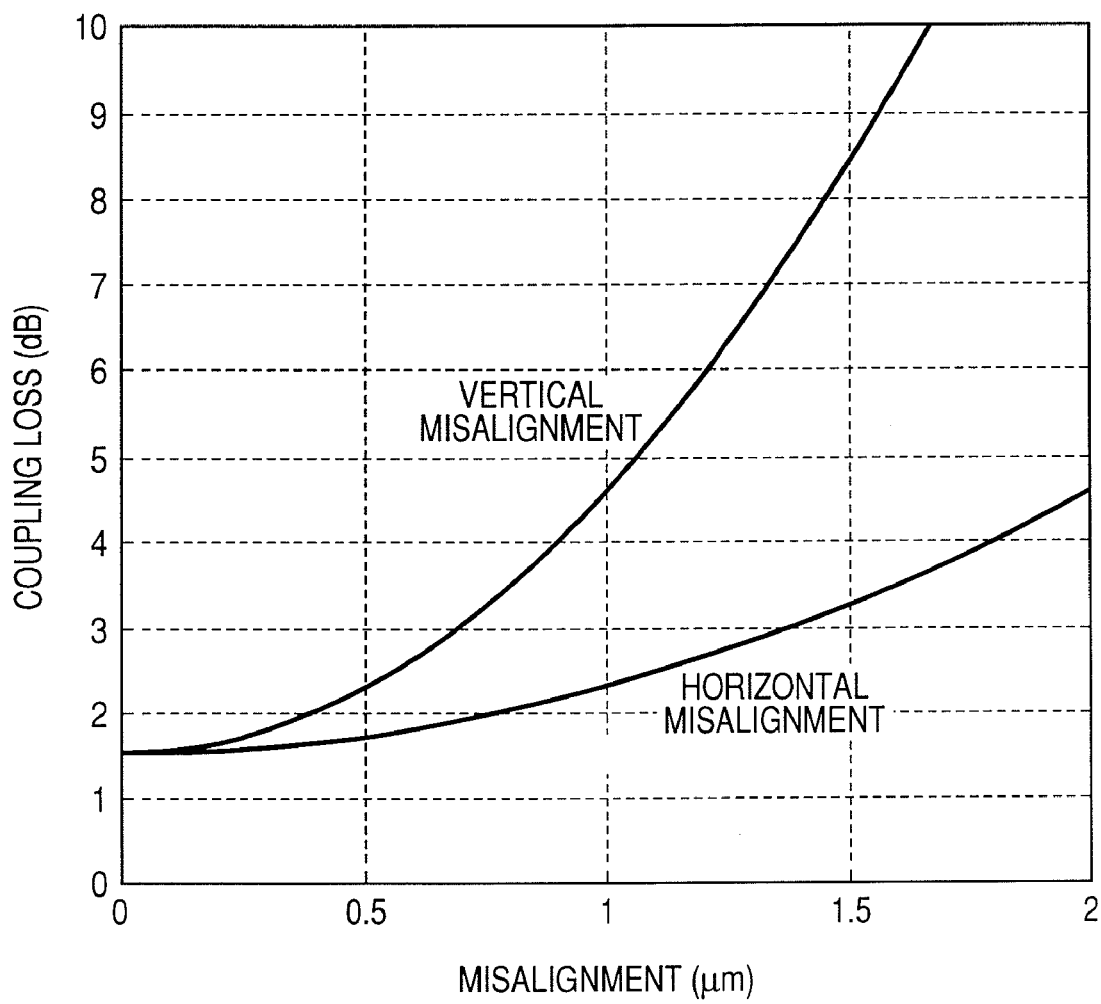
FIG. 5 is a graph which shows the calculated axis deviation dependence on the coupling efficiency of an LD element and an optical waveguide.
Figure 6:
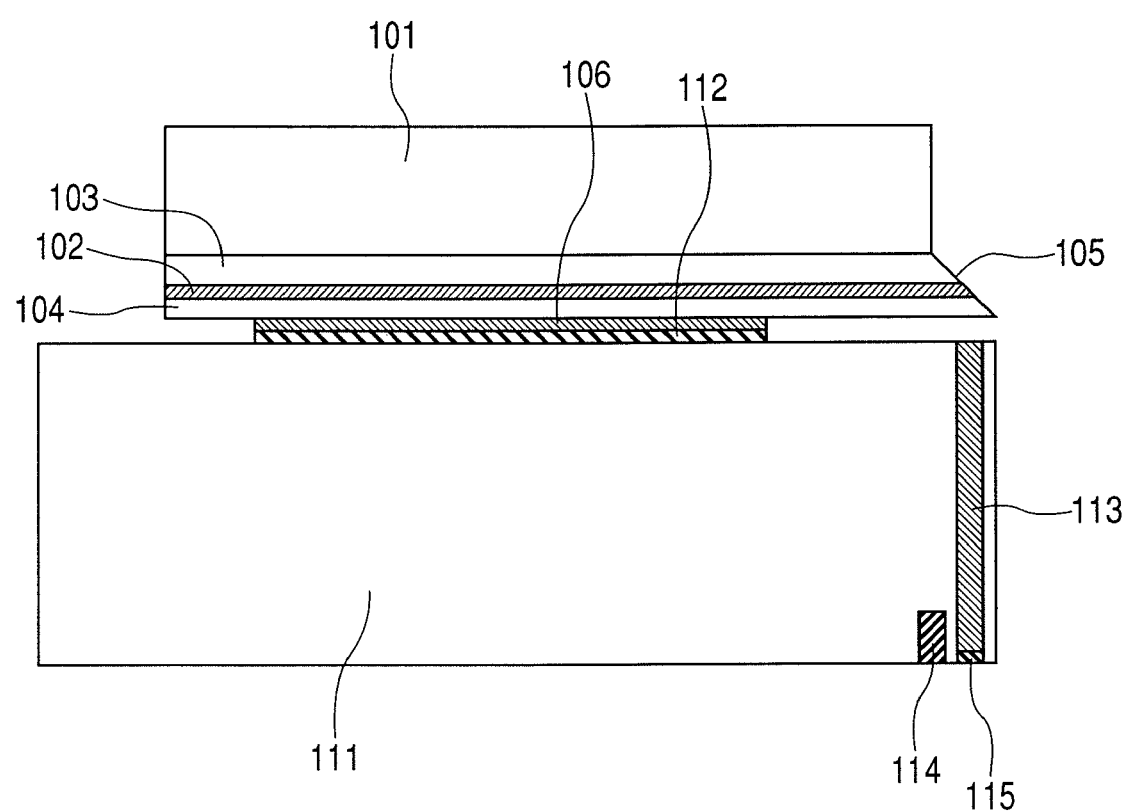
FIG. 6 is a cross-sectional drawing along the direction of the cavity of an LD element in a recording head on which a semiconductor LD element is mounted, where a reflector of the embodiment in this invention is monolithically integrated.
Figure 7:
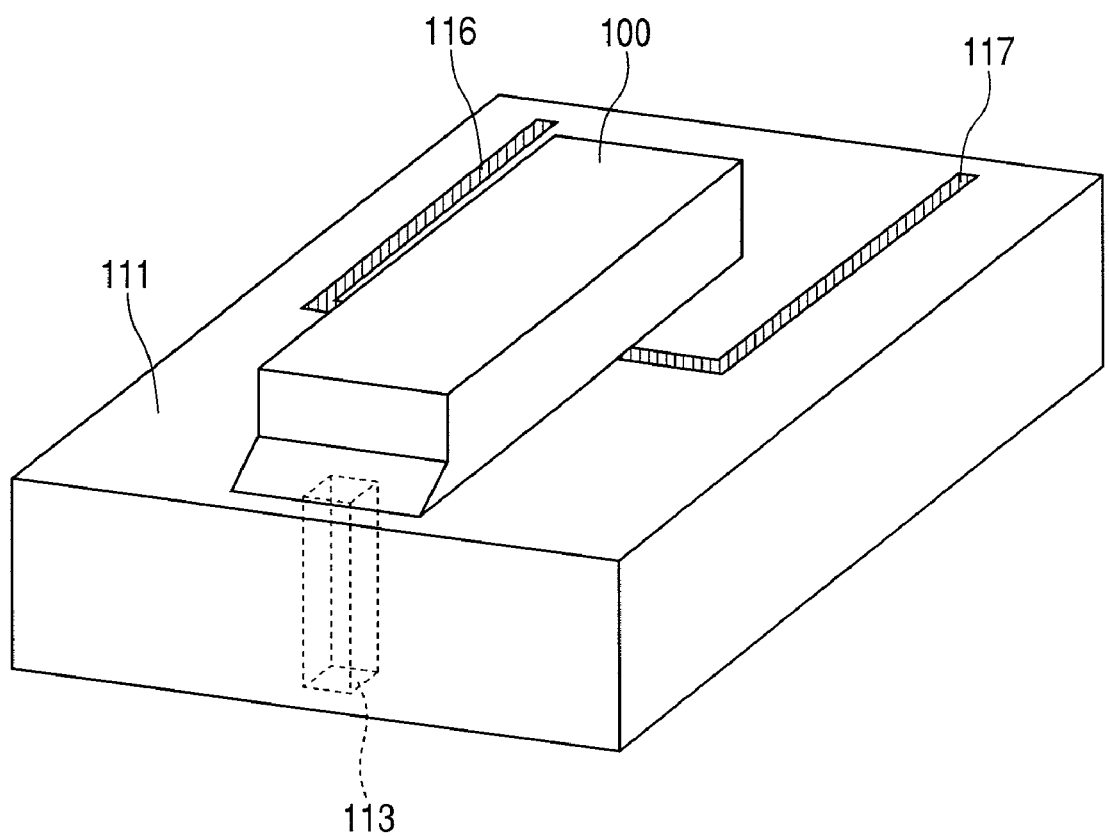
FIG. 7 is a perspective drawing illustrating a recording head on which a semiconductor LD element is mounted, where a reflector of the embodiment in this invention is monolithically integrated.

FIG. 6 is a cross-sectional drawing along the direction of the cavity of an LD element in a recording head on which a semiconductor LD element is mounted, where a reflector of the embodiment in this invention is monolithically integrated. FIG. 7 is a perspective drawing illustrating the same structure. The LD element monolithically integrates the reflector 105 and emits beam from the face of a side opposite the substrate 101. The aforementioned LD element includes the active layer 102 in a direction parallel to the upper face of the slider 111, and the surface of the side closer to the active layer 102, that is, the face of the side opposite the substrate 101 approaches the upper face of the slider 111 and is mounted. The optical emission position of the LD element is mounted to adjust to the optical injection position of the optical waveguide 113 formed in the slider. Solder 112 is placed over the upper face of the slider and mounted to be welded to the electrode 106 of the LD element. The optical waveguide 113 for guiding the beam generated in the LD element to the optical transducer 115 and the magnetic transducer 114 used for magnetic recording are provided.

Figure 8:
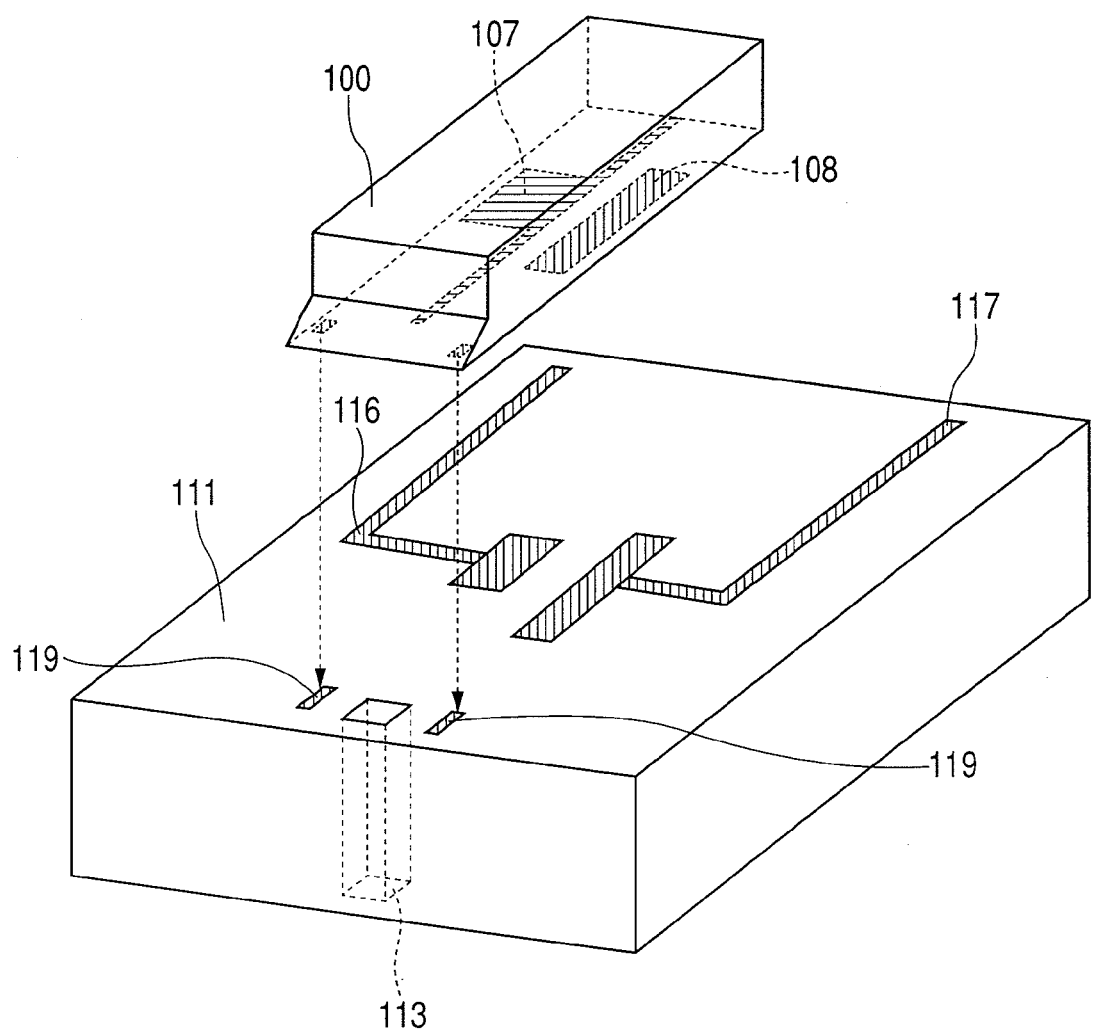
FIG. 8 is a schematic drawing illustrating a state where the LD element is mounted over the slider.

FIG. 8 is a schematic drawing illustrating a state where the LD element is mounted over the slider. When the LD element 100 is mounted over the slider 111, it is welded by using solder so that the lead lines 116 and 117 for the LD drive power supply placed over the upper face of the slider are connected to the p- and n-electrodes of the LD. As a result, the p-electrode and the n-electrode are connected to each lead line. Accurate registration of position while mounting is carried out so that the marker 109 provided in the mounting face of the LD lies opposite the marker 119 provided in the upper face of the slider. The displacement of the optical axis is controlled to be within 1 μm in the longitudinal direction and an optical coupling efficiency sufficient for the purpose can be obtained in the case of an infrared transmission method, etc. being used when the markers are matched using aligners.

Second Embodiment

Figure 9:
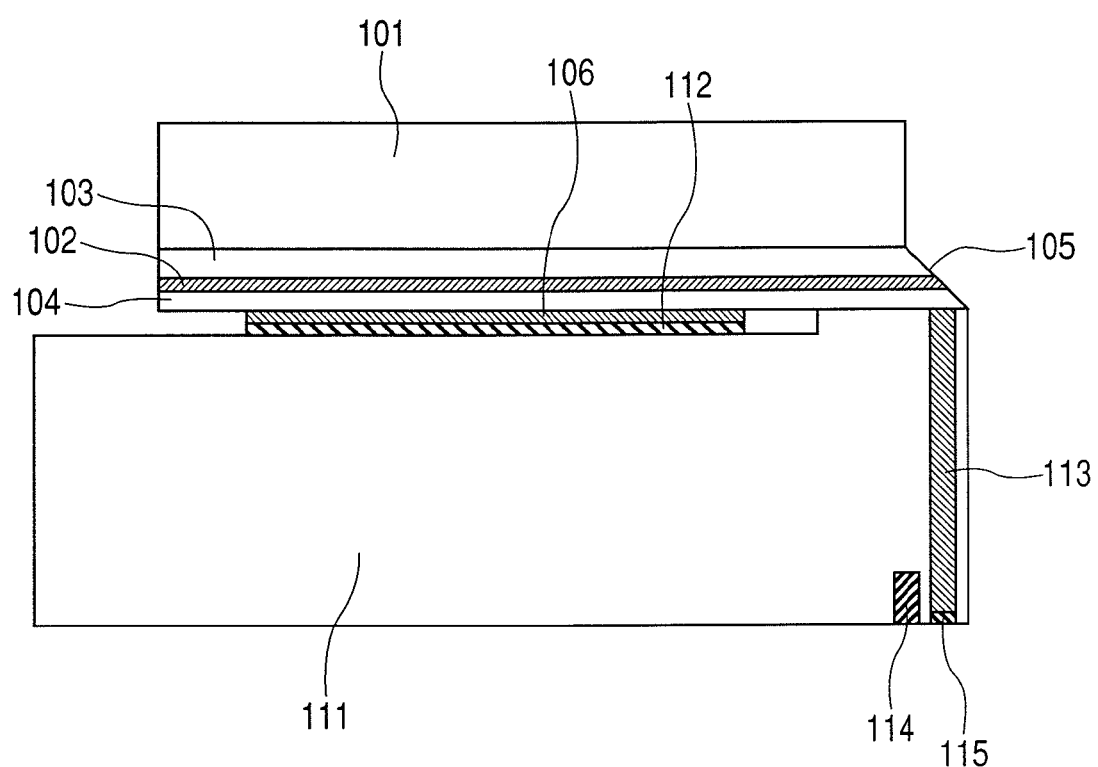
FIG. 9 is a cross-sectional drawing along the direction of the cavity of an LD element in a recording head on which a semiconductor LD element is mounted, where a reflector of the embodiment in this invention is monolithically integrated.
Figure 10:
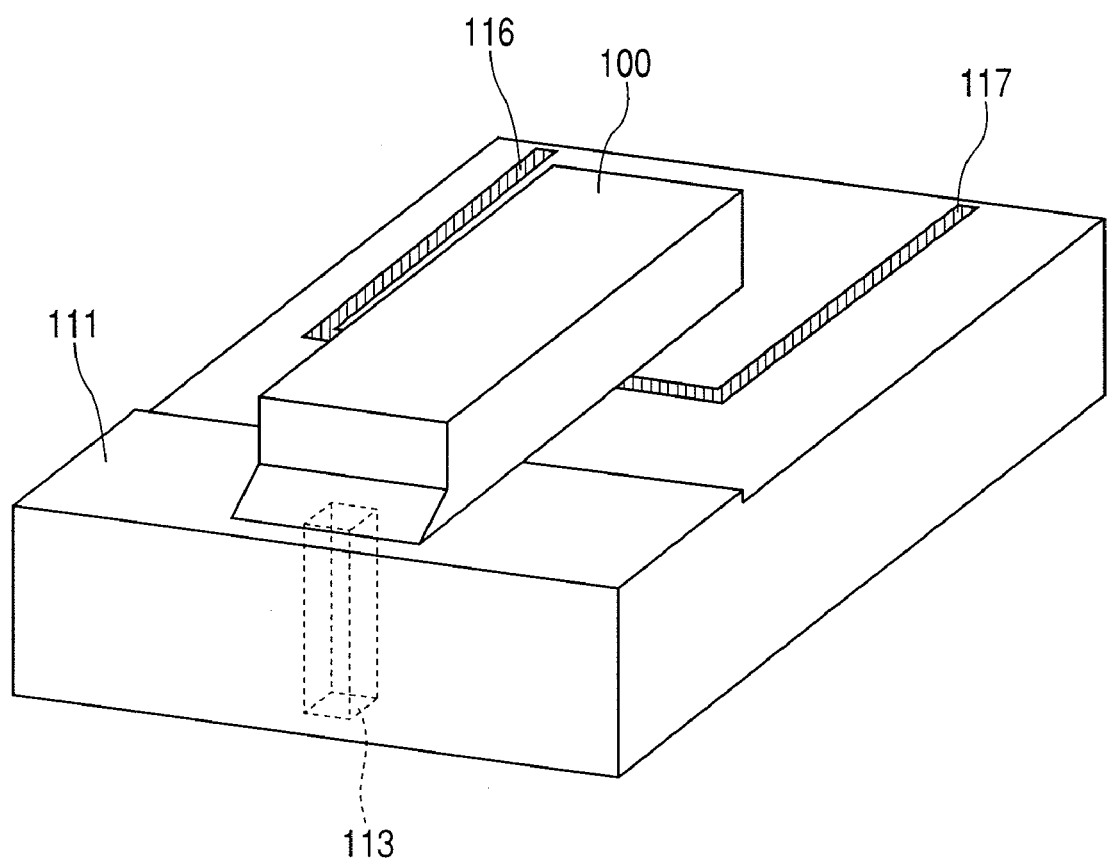
FIG. 10 is a perspective drawing illustrating a recording head on which a semiconductor LD element is mounted, where a reflector of the embodiment in this invention is monolithically integrated.

FIG. 9 is a cross-sectional drawing along the direction of the cavity of an LD element in a recording head on which a semiconductor LD element is mounted where a reflector of the embodiment in this invention is monolithically integrated. FIG. 10 is a perspective drawing illustrating the same structure. It is an example in which the face for mounting an LD element is made lower by the same amount as the height corresponding to the thickness of the adhesive used for mounting.

When the LD element is mounted over the slider, a solder is used for a conductive adhesive. Since solder usually has a thickness of several microns, a gap is created by the same amount corresponding to the thickness of the solder between the optical emission position of the LD element and the injection position of the optical waveguide over the slider. In order to improve the optical coupling efficiency by compensating for the amount corresponding to the thickness, the part for mounting the LD element over the slider is made lower than the other slider surface. Solder 112 matched to the electrode of the LD is placed at the part which is made lower in the slider. Registration of position can be done by the same method as in the first embodiment.

Third Embodiment

Figure 11:
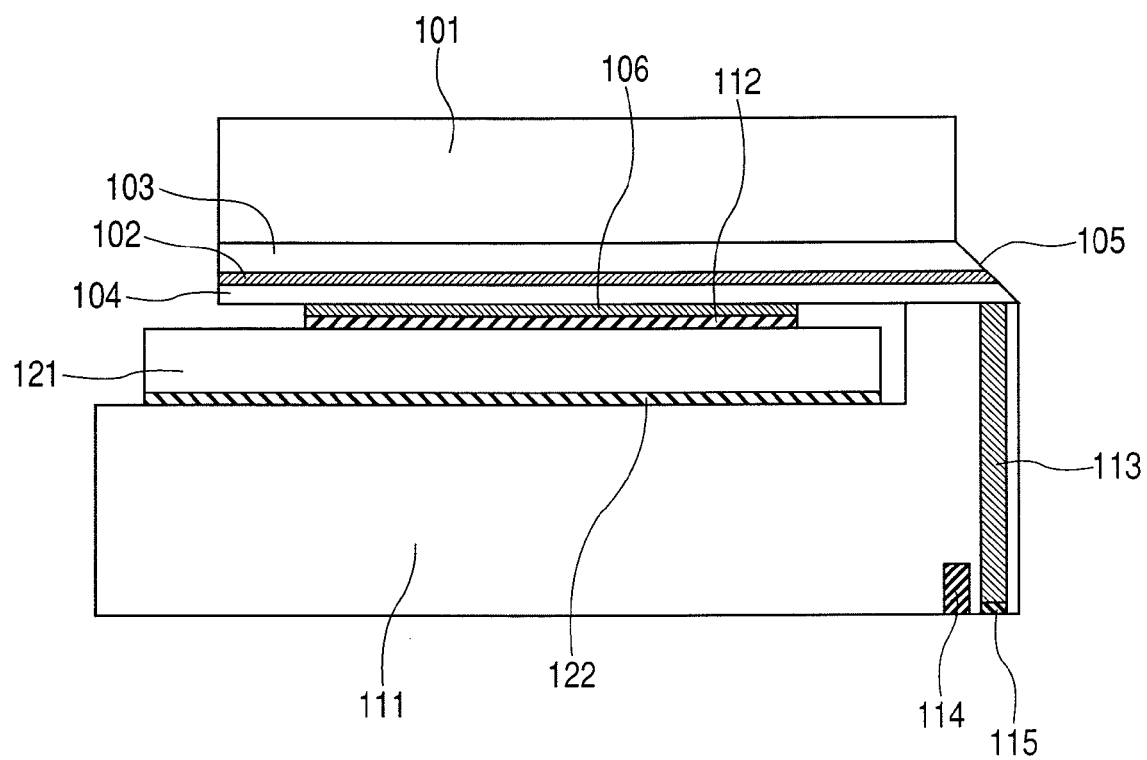
FIG. 11 is a cross-sectional drawing along the direction of the cavity of an LD element in a recording head on which a semiconductor LD element is mounted, where a reflector of the embodiment in this invention is monolithically integrated.
Figure 12:
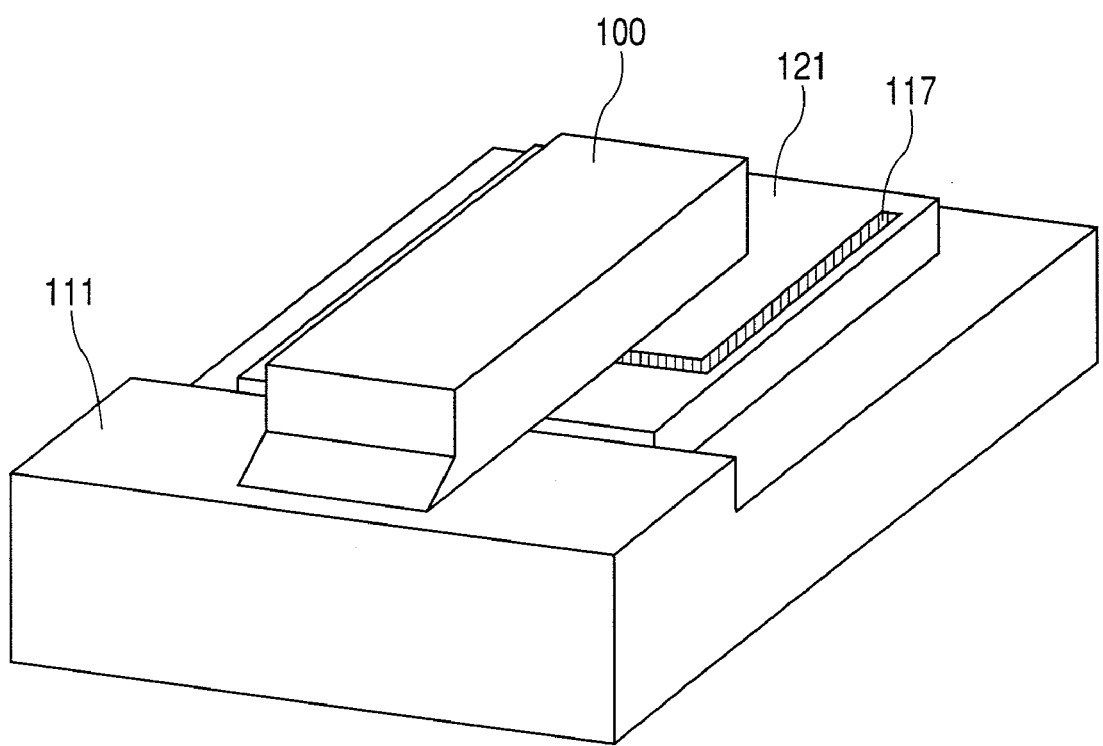
FIG. 12 is a perspective drawing illustrating a recording head on which a semiconductor LD element is mounted, where a reflector of an embodiment in this invention is monolithically integrated.

FIG. 11 is a cross-sectional drawing along the direction of the cavity of an LD element in a recording head on which a semiconductor LD element is mounted where a reflector of the embodiment in this invention is monolithically integrated. FIG. 12 is a perspective drawing illustrating the same structure. It is a structure where a submount 121 is sandwiched between the LD element and the slider, and active alignment can be applied by adopting this structure. An adhesive 122 is used for the joint between the submount 121 and the slider 111. A metallic solder and a chemical adhesion system resin can be used for the adhesive 122.

Figure 13:
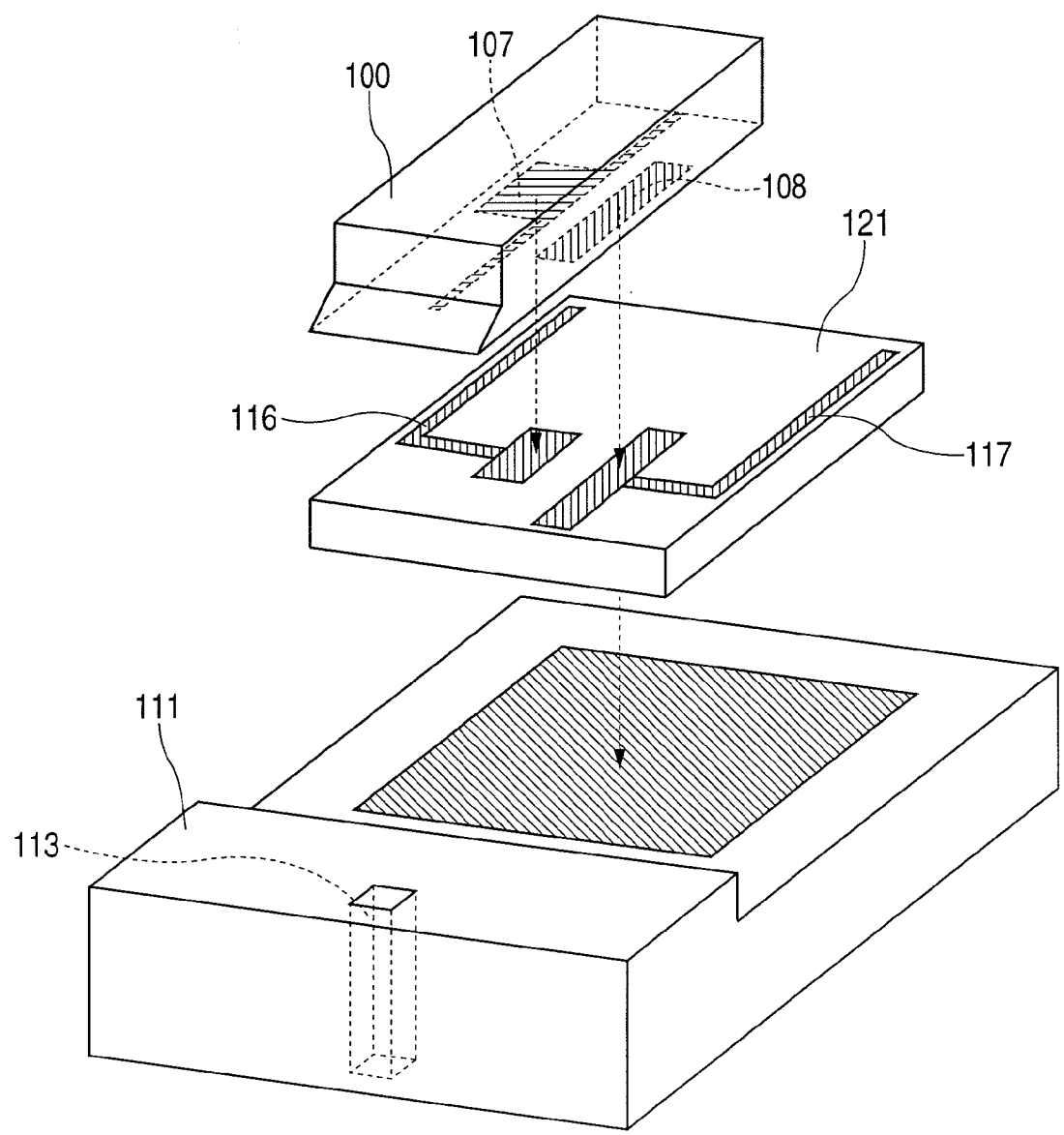
FIG. 13 is a schematic drawing illustrating a state where the LD element and the submount are mounted over the slider.

FIG. 13 is a schematic drawing illustrating a state where the LD element and the submount are mounted over the slider. At first, the LD element where the reflector is integrated is mounted over the submount 121. Lead lines 116 and 117 for the LD drive power supply are provided over the submount and the p-electrode and n-electrode are connected to each lead line when the LD element is mounted. The LD element can emit beam by supplying power to the lead lines. It is customary that a positive potential is applied to the lead line connected to the p-electrode and the lead line connected to the n-electrode is grounded.

Next, the submount where the LD element is mounted is mounted over the slider. Aligning the position with the slider and mounting while the LD continues to emit beam is active alignment. An optical receiver is arranged at the lower face of the slider to be ready for detecting the output of the beam passing through the waveguide. Moving the submount over a minute region, the LD element is fixed to a position where the beam passing through the waveguide becomes greatest. Compared with the passive alignment shown in the first embodiment, more accurate alignment becomes possible by actually monitoring the coupling light.

Fourth Embodiment

Figure 14:
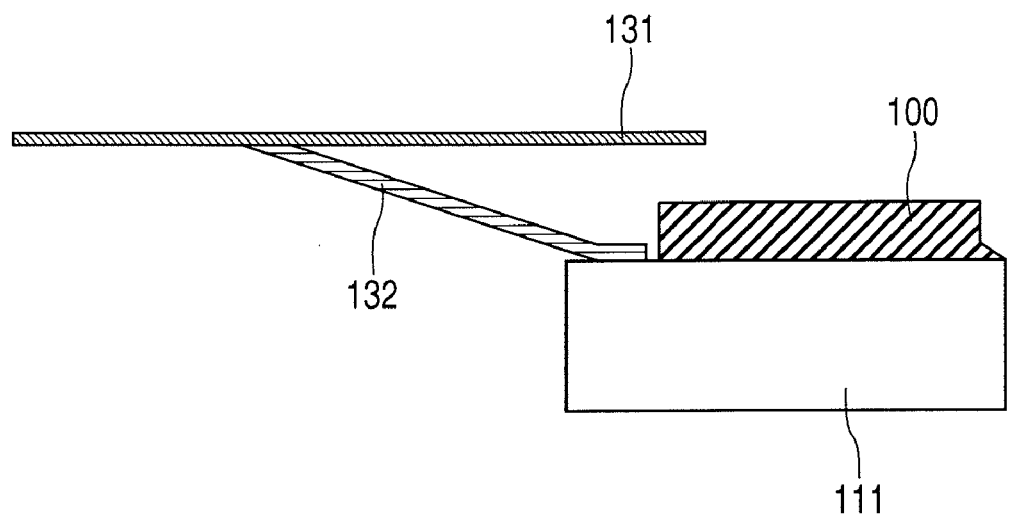
FIG. 14 is a schematic drawing where a recording head which is an embodiment of the present invention is connected to a suspension for mechanically driving the head.

FIG. 14 is a schematic drawing showing a recording head which is an embodiment of the present invention being connected to a suspension which mechanically drives the head. The slider 111 where the LD element 100 is mounted is connected to the suspension 131 by a flexor 132. In the case of a thermally assisted magnetic recording head, the power for driving the magnetic field generation coil and the LD element is supplied through the lead lines which are provided to the flexor and the suspension.

Fifth Embodiment

Figure 15:
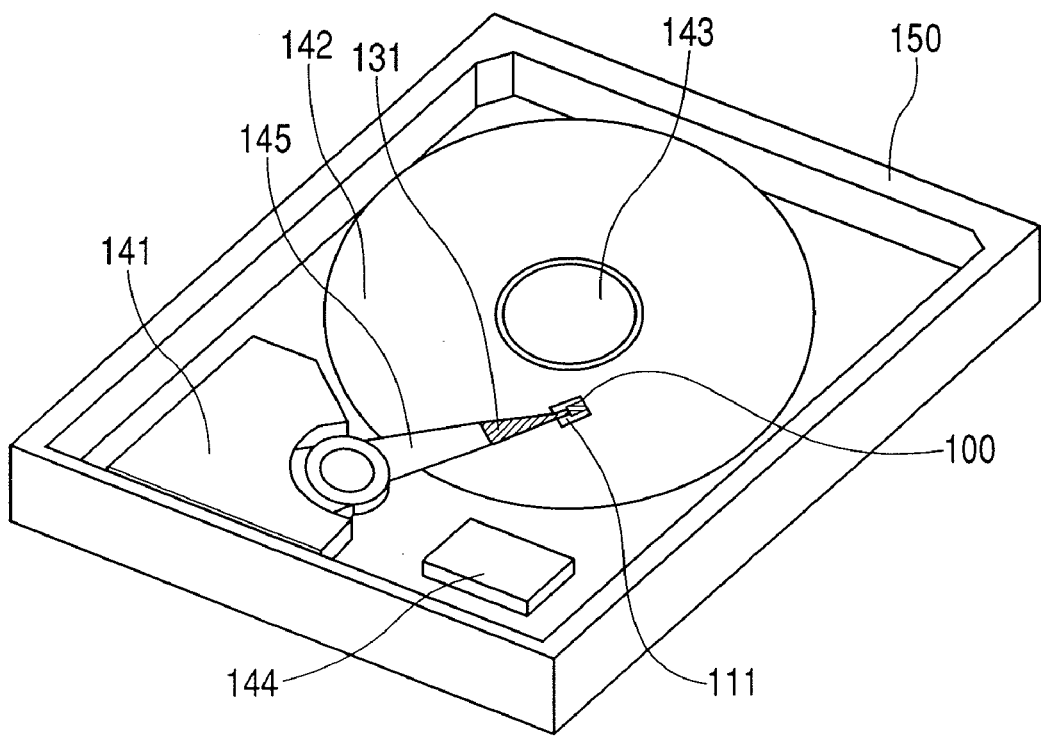
FIG. 15 is a schematic drawing illustrating a recording disk device which uses a recording head of the present invention.

FIG. 15 is a schematic drawing illustrating a recording disk device which uses a recording head of the present invention. The recording disk 142 which is a recording medium is placed in the package 150 for the recording disk and the recording disk 142 is rotated by the spindle 143. The LD element 100 is mounted over the slider 111 and the slider is connected to the arm 145. The arm is driven by a voice coil motor 141 and the head is moved to a position for recording over the rotation disk. A signal processing LSI 144 for processing the write/read information of the recording data is also installed in the package.

According to the embodiment of the present invention, in the case of mounting an LD element over the slider, beam can be guided to an optical transducer with high optical coupling efficiency without using many optical components. As a result, a recording head which produces optical near-field suitable for optical recording and thermally assisted magnetic recording can be achieved.

What is claimed is:

1. A recording head comprising:
a semiconductor laser diode having a mirror in which a lower cladding layer, an active layer, and an upper cladding layer are laminated over a semiconductor substrate, in order, from said substrate side, and an output beam from said active layer is reflected by said mirror making at least a part or all of one edge side an inclined face,
wherein said inclined face is provided to have wider skirts from said substrate side in the direction of the face opposite the substrate, and said inclined face is provided to have wider skirts along a direction of a cavity,
wherein an optical waveguide is provided in a direction of a thickness of a slider and penetrating said slider in the vicinity of one edge of said slider, and an optical transducer is provided at an air bearing surface (ABS: Air Bearing Surface) of said slider,
wherein the opposite face of said substrate surface of said semiconductor laser diode is fixed to an opposing face of the air bearing surface of said slider, and the optical axis of the emitting beam from said mirror is fixed so as to be substantially in agreement with the optical axis of said optical waveguide; and
wherein an electrode of said semiconductor laser diode is provided on the face opposite said substrate surface, and an electric lead line is provided over the slider for supplying electric power in order to drive said semiconductor laser diode, said electrode of said semiconductor laser diode and said electric lead line provided over said slider being connected to each other.

2. A recording head according to claim 1,
wherein an edge side of the air bearing surface side of said optical waveguide and a part in the vicinity thereof comprise said optical transducer.

3. A recording head according to claim 1,
wherein a magnetic transducer is provided in said slider.

4. A recording head according to claim 1,
wherein a mirror face of said mirror is arranged at an angle of substantially 45 degrees with respect to the direction of said cavity and the index of refraction of material constituting said mirror is 3 or greater.

5. A recording head according to claim 4,
wherein said mirror is formed of the material which is substantially transparent to an emission wavelength of said semiconductor laser diode.

6. A recording head comprising:
a semiconductor laser diode having a mirror in which a lower cladding layer, an active layer, and an upper cladding layer are laminated over a semiconductor substrate, in order, from said substrate side, and an output beam from said active layer is reflected by said mirror making at least a part or all of one edge side an inclined face,
wherein said inclined face is provided to have wider skirts from said substrate side in the direction of the face opposite the substrate, and said inclined face is provided to have wider skirts along a direction of a cavity,
wherein an optical waveguide is provided in a direction of a thickness of a slider and penetrating said slider in the vicinity of one edge of said slider, and an optical transducer is provided at an air bearing surface (ABS: Air Bearing Surface) of said slider,
wherein the opposite face of said substrate surface of said semiconductor laser diode is fixed to an opposing face of the air bearing surface of said slider, and the optical axis of the emitting beam from said mirror is fixed so as to be substantially in agreement with the optical axis of said optical waveguide;
wherein both a p electrode and n electrode of said semiconductor laser diode are provided on the face opposite said substrate surface, and an electric lead line is provided over the slider for supplying electric power in order to drive said semiconductor laser diode,
wherein markers are formed at the face connected to the slider of said semiconductor laser diode and the face connected to the laser diode of the slider to be at positions opposing each other when they are mounted.

7. A recording head according to claim 6,
wherein a part where a laser diode element of said slider is mounted is made lower than the other slider surface.

8. A recording head according to claim 7,
wherein a submount is inserted between the slider and the laser diode element.

* * * * *